US005147106A

United States Patent [19]

Bartelt et al.

[11] Patent Number: 5,147,106

[45] Date of Patent: Sep. 15, 1992

[54] REINFORCED VEHICLE REAR GATE WITH OPTIONAL HYDRAULIC OPERATION

[75] Inventors: Robert D. Bartelt, Merton; William W. Belson, III, Nashota; Michael R. Bruno, 3950 Southwood Dr., Oconomowoc; Robert M. Boyd, Watertown, all of Wis.

[73] Assignee: Michael Roman Bruno, Oconomowoc, Wis.

[21] Appl. No.: 686,863

[22] Filed: Apr. 15, 1991

Related U.S. Application Data

[63] Continuation of Ser. No. 437,792, Nov. 16, 1989, abandoned.

[51] Int. Cl.[5] .................... B60J 5/10

[52] U.S. Cl. .................... 296/202; 296/56; 296/30

[58] Field of Search .................... 296/76, 106, 56, 146, 296/30, 202; 49/340, 344; 267/120

[56] References Cited

U.S. PATENT DOCUMENTS

| | | | |
|---|---|---|---|
| 2,239,029 | 4/1941 | Barrett | 49/340 X |
| 2,535,600 | 12/1950 | Rappl | 296/76 |
| 2,737,254 | 3/1956 | Bayley | 296/76 X |
| 3,869,168 | 3/1975 | Matheson | 296/56 |
| 4,045,008 | 8/1977 | Bauer | 267/120 |
| 4,183,575 | 1/1980 | Hayashi | 296/56 |
| 4,858,981 | 9/1981 | Post | 296/76 |

FOREIGN PATENT DOCUMENTS

| | | | |
|---|---|---|---|
| 62568 | 10/1982 | European Pat. Off. | 296/146 |
| 3310525 | 9/1984 | Fed. Rep. of Germany | 296/146 |
| 3636789 | 5/1988 | Fed. Rep. of Germany | 296/76 |
| 35670 | 2/1985 | Japan | 296/106 |
| 241214 | 10/1986 | Japan | 267/120 |
| 77218 | 4/1987 | Japan | 296/76 |

*Primary Examiner*—Margaret A. Focarino
*Assistant Examiner*—Gary C. Hoge
*Attorney, Agent, or Firm*—Whyte & Hirschboeck

[57] ABSTRACT

A motor vehicle having a vertically openable access door includes a reinforcement bracket for each cylinder mounting. The bracket is bent to provide tortional and other force absorption capability. The bracket is also of sufficient size to cover the immediate area where a cylinder is mounted and any remote locations where forces may be applied through a moment arm created by rotation and exertion of a force on the vehicle by a cylinder. The cylinders may be hydraulically operated to effectuate opening and closing of the door.

19 Claims, 3 Drawing Sheets

REINFORCED VEHICLE REAR GATE WITH OPTIONAL HYDRAULIC OPERATION

This is a continuation of copending application(s) Ser. No. 07/437,792 filed on Nov. 16, 1989 now abandoned.

BACKGROUND OF THE INVENTION

1. Field of the Invention

The present invention relates generally to access gates and doors for motor vehicles. More particularly, the present invention relates to a reinforced rear gate for a mini-van type of vehicle permitting longer life of a vertically openable gate without damage due to stress on the anchoring points and vehicle frame. Additionally, a hydraulically operated version of the gate is disclosed. The present invention can be used in connection with a variety of equipment such as that manufactured and sold by Bruno Independent Living Aids, Inc. of Oconomowoc, Wis.

2. Description of the Related Areas of the Art

Mini-van types of vehicles have become extremely popular in the past several years as a desirable cross between more traditional passenger motor vehicles and earlier standard versions of vans. One feature of the mini-vans is a vertically pivoting rear gate permitting access to the rear compartment or compartments of the vehicle.

The rear gate is attached to the mini-van by one or more hinges along the upper edge of the gate. These hinges permit the door to pivotably swing between a lower closed position and a raised open position. To assist in opening and closing the rear gate, as well as holding the gate open in its raised position, a pair of gas cylinders is conventionally used. The cylinder is pivotably mounted to either the door or the mini-van. The rod which is extendable from the cylinder is attached to either the gate or the vehicle, depending on where the cylinder is attached. In the past, attachment to the vehicle has been at some point on the frame of the vehicle itself.

FIGS. 1 and 2 show the mounting assembly used in a number of mini-van models. A portion of the frame 50 extends laterally along the rear access opening of the vehicle. Typically thin sheet steel is used in the vehicle for this portion of the frame 50. FIG. 1 shows the mounting plate 52 which is mounted internally during assembly of the vehicle by providing two spot welds 54 between the mounting plate 52 and the frame 50.

Several problems have been encountered with this configuration. First, both the frame 50 and the plate 52 are painted prior to welding. This creates a contaminated weld spot at points 54, thereby weakening attachment of the plate 52 to the frame 50. A captured nut 56 is also used to assist in securing bolt 58 which is the location for the mounting of either cylinder or a rod in conventional mini-van models. Nut 56 has a serrated edge 60 which is used to initially embed nut 56 on the interior surface of plate 52. While the cylinder or rod is attached to bolt 58 and exerts a certain amount of stress on that bolt, a considerable amount of force is directed through a moment arm and applied to frame 50 at a remote location such as point 62. As can be seen in FIGS. 1 and 2, point 62 is outside the area covered by plate 52. Therefore, plate 52 does not assist in any way in absorbing the bulk of the force which is applied to the frame when the rear gate is opened and closed.

This defect has caused numerous breakdowns in the gate assembly within the first several years of operation of conventional mini-van models. The problems experienced include, but are not limited to, stress damage at points in the frame 50 where force is applied (such as point 62), breaking of the spot weld points 54 and damage to and loss of nut 56 and bolt 58.

Further, manual opening and closing of a rear gate can be a complicated and, at times, impossible operation for one who is physically disabled (e.g., handicapped individuals and elderly persons). Exertion of adequate force to open and close a rear gate and possessing the physical range of motion necessary to do so may prevent some individuals from being able to use a mini-van. This is particularly troublesome since individuals requiring motive assistance in the form of wheelchairs, or power operated equipment to be used in lieu of walking, typically find a mini-van to be an extremely useful vehicle for transporting such equipment and thus increasing their independence and mobility.

Gate configurations, adaptable to various access locations of a motor vehicle, which overcome the above noted shortcomings of other gates would be a significant advancement in the art.

OBJECTS AND SUMMARY OF THE INVENTION

It is a primary object of the present invention to provide a rear gate configuration having an extended operational life, and which is easy an inexpensive to incorporate into existing designs of mini-vans.

It is a different object of the present invention to provide a rear gate configuration which is easily retrofitted into existing mini-vans to extend the life of the gas cylinder struts thereon.

It is one other object of the present invention to provide a rear gate configuration adaptable to mini-vans, and other similar vehicle structures, which provides access to individuals who are physically unable to manually operate such a gate access in a reliable and uncomplicated manner.

One more object of the present invention is to provide a rear gate configuration incorporating a plurality of devices and/or mechanisms to reduce the risk of improper operation of a powered gate configuration.

How these and other objects of the present invention are accomplished will be explained in a detailed description of the preferred embodiment of the present invention in connection with the FIGURES. Generally, however, the objects of the invention are accomplished in a vehicle having a vehicle frame and a vertically openable access door. The opening and closing of the door are assisted by a pair of cylinders pivotably mounted on the door and the vehicle frame. Means are provided for reinforcing the mounting between the cylinders and the vehicle frame. The reinforcement bracket is riveted to the frame and any existing reinforcement plate that may be present. The bracket is bent to add tortional and other force absorption capability. Furthermore, the bracket is of sufficient size to cover not just the immediate area where the cylinder is mounted, but also to cover any remote locations where forces may be applied through a moment arm created by rotation and exertion of a force on the frame by the cylinder. Additionally, the cylinders may be hydraulically operated to effectuate opening and closing of the door. A switch is magnetically operated to either open or close the door. In addition, numerous devices, such as a warning buzzer and check valve system internal to the cylinders, may be used to reduce risk of personal injury or property damage by the door.

Other ways in which the objects are accomplished will become apparent to those presently of ordinary skill in the art after reviewing the specification.

DESCRIPTION OF THE DRAWINGS

In the FIGURES, like reference numerals refer to like components.

DETAILED DESCRIPTION OF THE PREFERRED EMBODIMENT

Figure 3:
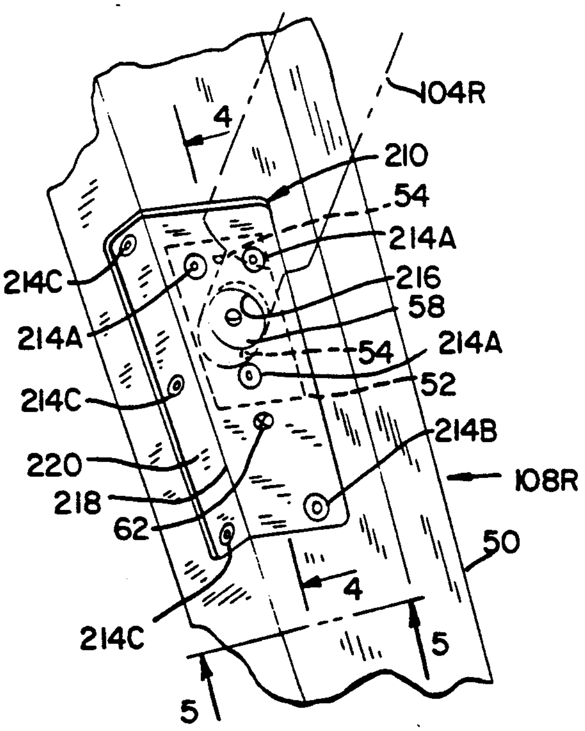
FIG. 3 is a plan view of the reinforcement bracket of the present invention.
Figure 5:
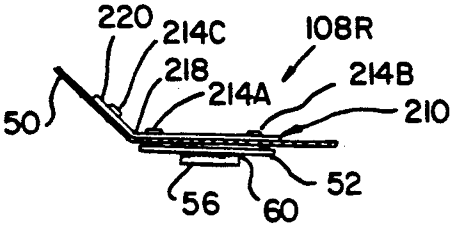
FIG. 5 is a cross-sectional view of the reinforcement bracket of the present invention taken along the line 5—5 of FIG. 3.

FIG. 3 illustrates the preferred embodiment of the reinforcement bracket 210 of the present invention. The bracket 210 is generally rectangular in shape with a small flap 220 extending laterally along the length of bracket 210. This flap 220 is created by bending the bracket 210 at line 218. As shown in FIG. 5, the bend is a sharp bend complementing a similar bend in the frame 50. The configuration shown in FIG. 3 corresponds to the mounting on the passenger side of a rear gate for a mini-van.

Figure 4:
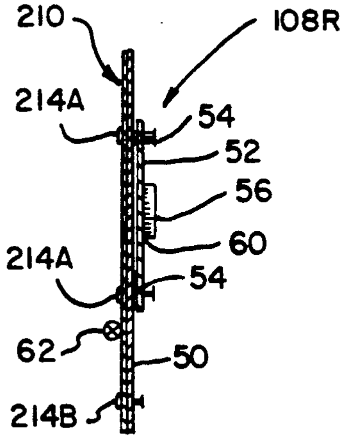
FIG. 4 is a cross-sectional view of the reinforcement bracket of the present invention taken along the line 4—4 of FIG. 3.

The original reinforcing plate 52 installed by the manufacturer may or may not still be present within the frame 50. Plate 52 is shown in dashed lines in FIG. 3 and is shown for illustrative purposes in FIGS. 4 and 5 as if it were still present. Spot welds 54 are also shown as being present, though they may not necessarily be present by the time reinforcement bracket 210 is installed. It should be noted that bracket 210 may be retrofitted to existing mounting assemblies on mini-vans, or may be installed in vehicles as they are constructed.

Bracket 210 is rigidly secured to frame 50 by a plurality of rivets 214. As shown in FIG. 3, three of the pop rivets 214A specifically are adapted to further reinforce plate 52, if it is still mounted to the frame 50. Rivets 214A further strengthen the specific location at which bolt 58 and cylinder 108 are attached to the frame 50.

Rivet 214B further strengthens the mounting system 200 in a different way. While the point 62 at which force is applied by the cylinder and rod is outside the area covered by plate 52, it is within the edges of bracket 210. In this way, the forces which are typically applied to frame 50, causing it to bend and eventually fail, are distributed not only over the immediate surface of frame 50, but also over the surface of bracket 210. Rivets 214 are positioned so that these forces are, in large part, absorbed by the bracket 210.

Another feature of bracket 210 further enhances the force absorption of the present invention. The bend line 218 creates a bracket capable of absorbing tortional and other forces applied at point 62 and throughout bracket 210 more effectively. The bent steel bracket 210 is more difficult to bend and twist when a flap 220 and bend line 218 are present. Therefore, while spot welds 54 provided some stability to mounting plate 52, the rivet and bent plate configurations of the present invention provide so much more additional operational life and strength to the mounting system 200, that the operational life of the mounting has been extended from a period of several years of ordinary use to over ten years of extremely hard use. The formed bracket 210 may be retrofitted to mountings which are already unusable. A nut may be embedded in the hole 222 through which bolt 58 normally passes.

Figure 1:
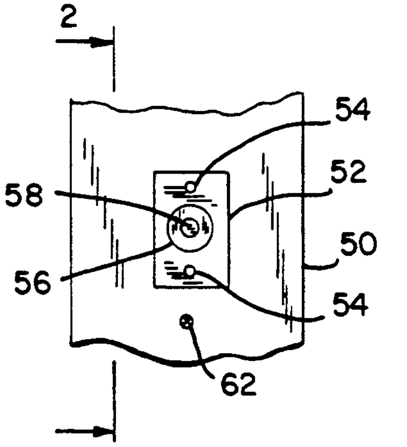
FIG. 1 PRIOR ART
FIG. 1 is a plan view of the internal mounting plate utilized in the prior art.
Figure 2:
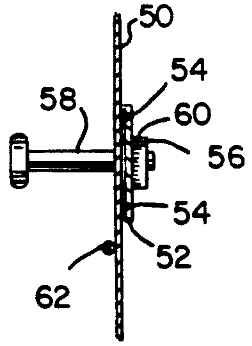
FIG. 2 PRIOR ART
FIG. 2 is a cross-sectional view of the prior art mounting plate taken along line 2—2 of FIG. 1.
Figure 6:
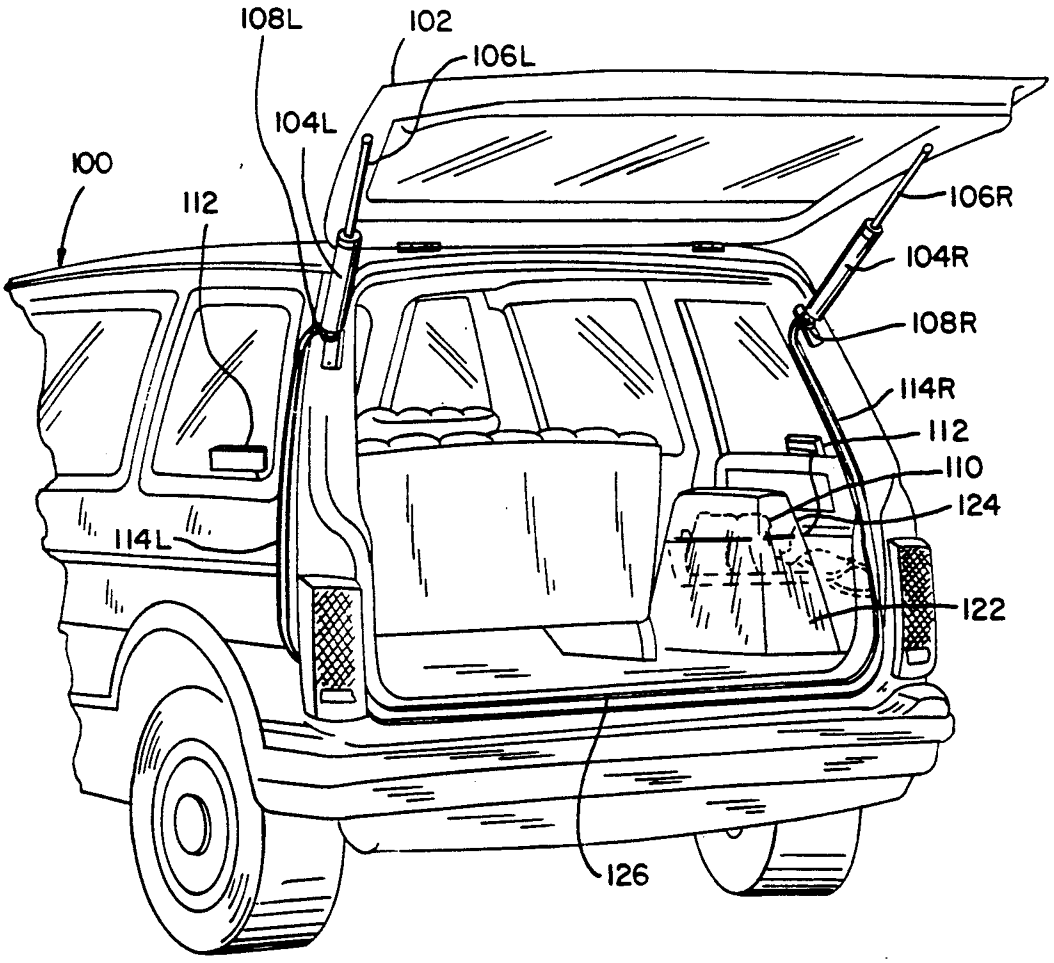
FIG. 6 is a plan view of a vehicle incorporating a hydraulic system of the present invention, the hydraulic system being shown in part in dashed lines.

FIG. 6 shows a mini-van 100 incorporating a further aspect of the present invention. Mini-van 100 has a rear gate 102 which is opened by vertically raising door 102. Cylinders 104 are secured to the frame of vehicle 100 at mountings 108. The mounting of cylinders 104 to the vehicle frame is preferably in the manner shown in FIGS. 3, 4 and 5. However, the configuration of FIGS. 1 and 2 or any other appropriate mounting means may be used to pivotably secure cylinders 104 to the frame of mini-van 100. Extendable from cylinders 104 are rods 106. As seen in the drawings, points 108L and 108R are both positioned rearwardly of the hinges attaching the door to the rear of the vehicle. Additionally, the ends of rods 106L and 106R are attached to the door at points more distant from the hinges than points 108L and 108R. The ends of rods 106R and 106L are attached to the door by means of pins or bolts 109R and 109L, respectively.

A common feature of mini-vans, such as vehicle 100 shown in FIG. 6, is rear wheel wells 122 which typically have a hinged upper section 124. Manufacturers traditionally have put cup holders and other convenience features in these wells. In the preferred embodiment of the present invention, the right rear wheel well 122 is used to house a motorized pump 110. In many mini-vans, this pump assembly 110 is installable without having to drill a single hole in the vehicle. Pump 110 is preferably self-contained in that it has its own motor and reservoir for operating cylinders 104.

Figure 8:
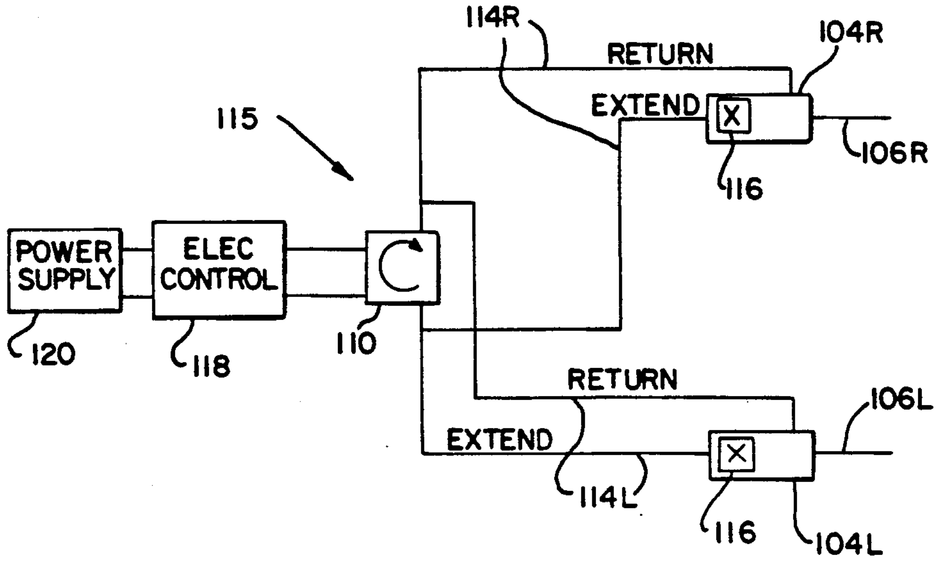
FIG. 8 is a hydraulic schematic of the hydraulic system shown in FIG. 6.

Cylinders 104 are the means which operate to open and close door 102. They are double acting, in order to control opening and closing precisely. Further, check valves 116, shown in the hydraulic circuit 115 of FIG. 8, are located within cylinders 104. Check valves 116 lock cylinders 104 in position whenever pump 110 is not operating. It is therefore possible to hold door 102 in any position between and including the completely opened and closed positions. Additionally, check valves operate to allow the door 102 to close very slowly in the event of a hydraulic line break.

Hydraulic lines 114 run from the pump 110 internally through plastic moulding in the vehicle to each of the cylinders 104, as shown in FIG. 6. The lines are therefore protected and virtually invisible after installation. The power supply 120 for the hydraulic circuit can be either the battery of the vehicle 100 or a separate electrical power supply. Preferably, the power supply 120 consists of a 12 volt automative battery which powers the reversing motor pump and reservoir combination 110.

Figure 7:
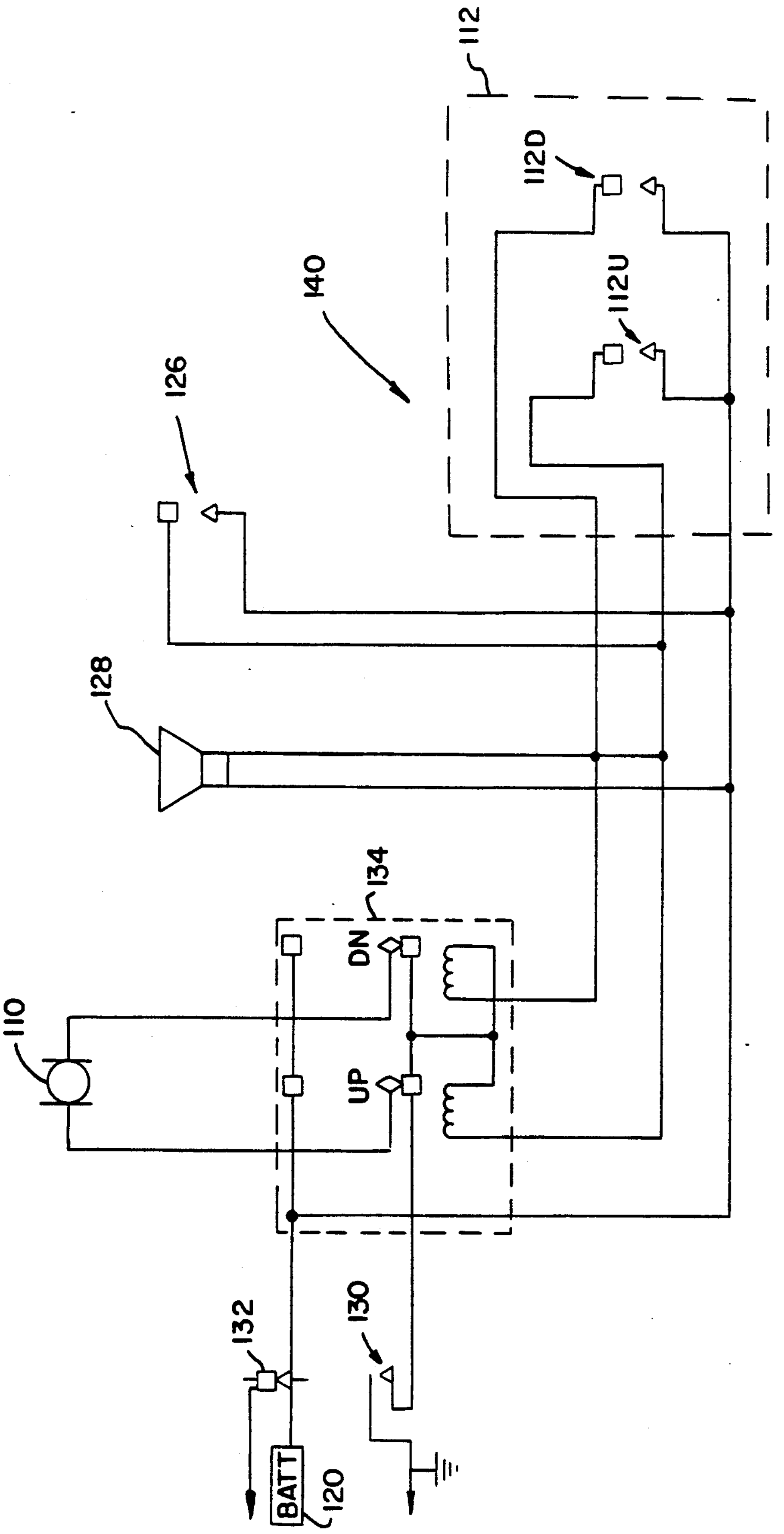
FIG. 7 is an electrical schematic of the control circuit of the hydraulic system shown in FIG. 6.

The hydraulic circuit 115 is controlled by the electrical circuit 140 of FIG. 7. Electrical circuit 140 is turned on and off using a magnetic key with switch 112. In FIG. 6, switch 112 is a pair of encased magnetically tripped reed switches mounted in either rear side window or, optionally, mounted in one or both of the tail lights. Switch 112 is located so that an operator has a clear view of gate 102 throughout its range of motion. As seen in FIG. 7, reed switches 112U, 112D are normally open and can be closed by the operator holding a magnetic key adjacent to either the up switch 112U or the down switch 112D.

Triggering either switch 112U, 112D initiates operation of the pump 110 and the appropriate pumping of hydraulic fluid to or from cylinders 104. The signals from reed switches 112U, 112D are processed in a potted relay assembly 134 which is powered by power supply 120.

A thermal circuit breaker 132, which is preferably self resetting, prevents the unit from overheating and also can shut the unit off in case of a short circuit. A master switch 130 may be placed on the dashboard or elsewhere in the vehicle and consists of a normally opened on/off switch. Two other features of the circuit 140 of FIG. 7, warning buzzer 128 and tape switch 126, help reduce risk of inadvertent or accidental operation of the hydraulic circuit and further reduce the chance of injury to persons standing in the vicinity of the rear gate 102.

Actually, there are four devices incorporated into the unit which reduce potential property damage and personal injury in the vicinity of the rear gate 102. First, the check valves 116 in the cylinders 104, as noted above, stop and lock the cylinders 104 in place whenever pump 110 stops operating. Check valves 116 also greatly slow closing of the gate 102 in case of hydraulic line breakage. Second, the circuit breaker 132 prevents the unit from overheating and shuts off the circuit 140 in case of a short circuit. Third, there is an audible alarm which in the preferred embodiment is a warning buzzer 128. Buzzer 128 continually sounds while gate 102 is either opening or closing. Finally, a tape switch 126 is mounted along the door frame edge, as shown in FIG. 6. A coacting switch component 127 is positioned on the door at a location which adjoins switch 126 when the door is closed.

Tape switch 126 is a normally open switch which shuts the system off if the gate 102 comes into contact with any obstacle while closing. Closing of the switch 126 in such a situation automatically shuts off power to the hydraulic circuit 115 and reverses pump directional operation until the gate 102 is either open or sufficiently clear of whatever obstacle is blocking the closure of gate 102. These four features help reduce risk of personal injury to anyone in the vicinity of gate 102 and reduce the risk of property damage to the gate or to other property in the near vicinity.

Other Variations, modifications and other applications of the present invention will become apparent to those presently of ordinary skill in the art after reviewing the specification in connection with the FIGURES. For example, a pneumatic circuit could be used in place of the hydraulic circuit of the preferred embodiment. Therefore, the above description of the preferred embodiment is to be interpreted as illustrative rather than limiting. The scope of the present invention is limited only by the scope of the claims which follow.

What is claimed is:

1. In a vehicle having a frame and a vertically openable hinged door, said door being movable by at least one selectively powered cylinder, each said cylinder having a rod slideable therein, including means for pivotably mounting each said rod to said door, the improvement comprising:

(a) means for pivotably mounting each said cylinder to said frame at a frame mounting point, each said frame mounting point being located rearward from the vertical plane defined by the hinge of said door; and (b) means for reinforcing said frame mounting means, said reinforcing comprising:

(1) a bracket mounted to the exterior of said frame; and (2) a plurality of members rigidly securing said bracket to said frame;

wherein said bracket covers the points on said frame at which forces are applied when said door is in motion;

further wherein said securing members define an area on said frame which includes the points on said frame at which forces are applied when said door is in motion;

further wherein said bracket is bent to increase the ability of said bracket to absorb and distribute forces applied to said frame when said door is in motion.

2. The vehicle of claim 1 wherein each said cylinder is selectively powered by circuit means comprising:

(a) a pump;

(b) a plurality of lines connecting said pump to each said cylinder;

(c) a power supply for said pump; and (d) switch means for selectively operating said pump to move said door.

3. The vehicle of claim 2 further comprising safety means for reducing the risk of injury when said door is in motion.

4. The vehicle of claim 3 wherein said vehicle is a mini-van.

5. The vehicle of claim 4 wherein said safety means comprises:

(a) means mounted along the edge of said door for shutting off said circuit means when said door contacts an obstacle while closing;

(b) locking means in said circuit means, wherein said locking means locks each said cylinder in position when said pump is not operating, further wherein said locking means permits said door to close at a very slow rate in the event of a line break in said circuit means; and (c) warning means which operates continuously while said door is in motion.

6. The vehicle of claim 5 wherein said switch means comprises a plurality of magnetically tripped reed switches mounted proximate to said door.

7. The vehicle of claim 6 wherein said locking means comprises a check valve in each said cylinder.

8. The vehicle of claim 7 wherein said circuit means is hydraulic.

9. The vehicle of claim 7 wherein said circuit means is pneumatic.

10. The vehicle of claim 8 wherein said securing members are rivets.

11. In a vehicle having a frame and a vertically openable hinged door, movement of said door being controlled by a plurality of hydraulic cylinders, each said cylinder having a rod slideable therein, each said rod being pivotably mounted to said door, the improvement comprising:

(a) means for pivotably mounting each said cylinder to said frame at an existing frame mounting point located rearward of the hinge of said door;

(b) a reinforcement bracket engaging each said cylinder mounting means and being rigidly secured to the exterior of said frame by a plurality of rivets, wherein said bracket covers the points on said frame at which forces are applied when said door is in motion, further wherein said rivets define an area on said frame which includes the points at which forces are applied when said door is in motion, further wherein said bracket is bent to increase the ability of said bracket to absorb and distribute forces applied to said bracket when said door is in motion;

(c) hydraulic circuit means for selectively operating each said cylinder, said circuit means comprising:

(1) a pump;

(2) a plurality of lines connecting said pump to each said cylinder;

(3) a power supply for said pump; and (4) means for selectively operating said pump to move said door; and (d) safety means for reducing the risk of injury when said door is in motion.

12. The vehicle of claim 11 wherein said vehicle is a mini-van and wherein said door is the rear hatch of said mini-van.

13. The vehicle of claim 12 wherein said safety means comprises:

(a) means mounted to said door for shutting off said circuit means when said door contacts an obstacle;

(b) means, in said circuit means, for locking each said cylinder in position when said pump is not operating and for permitting said door to close at a very slow rate in the event of a line break in said circuit means; and (c) warning means which operates continuously while said door is in motion.

14. The vehicle of claim 13 wherein said switch means comprises a plurality of magnetically tripped reed switches mounted proximate to said door and wherein said locking means comprises a check valve in each said cylinder.

15. In a vehicle having a frame and originally equipped with a manually operated, vertically openable door, wherein said manual operation of said door was assisted by a pair of nonpowered cylinders pivotably mounted to said door and to said frame, at a point rearward of the hinge of said door, a powered cylinder system for controlling operation of said door, said system comprising:

(a) a pair of hydraulic cylinders, each said cylinder being pivotably mounted to said door and to said frame at the mounting points where the original nonpowered cylinders were mounted;

(b) a reinforcement bracket rigidly secured to the exterior of said frame by a plurality of rivets, wherein said bracket covers an area which includes the points at which forces are applied to said frame when said door is in motion, further wherein said rivets define an area which includes the points on said frame at which forces are applied when said door is in motion, and further wherein said bracket is bent to increase the ability of said bracket to absorb and distribute forces applied to said frame when said door is in motion;

(c) hydraulic circuit means for selectively operating said hydraulic cylinders, said circuit means comprising:

(1) a pump;

(2) a plurality of lines operably connecting said pump to said hydraulic cylinders;

(3) a power supply for said pump; and (4) a switch for selectively operating said pump to move said door; and (d) safety means for reducing the risk of injury when said door is in motion.

16. The vehicle of claim 15 wherein said safety means comprises:

(a) means mounted to said door for shutting off said circuit means when said door contacts an obstacle while closing;

(b) a check valve in each said hydraulic cylinder, each said valve locking said cylinder in position when said pump is not operating and each said valve permitting said door to close at a very slow rate in the event of a line break in said circuit means; and (c) warning means which operates continuously while said door is in motion.

17. The vehicle of claim 16 wherein said switch is located proximate to said door.

18. The vehicle of claim 17 wherein said vehicle is a mini-van and said door is the rear hatch of said mini-van.

19. In a vehicle having a frame and a vertically openable access door, the opening and closing of said door being assisted by at least one cylinder having a rod slidable therein, including first means for pivotably mounting said cylinder to said vehicle frame and second means for pivotably mounting said rod to said door, the improvement comprising:

means mounted to the exterior of said frame for reinforcing said first mounting means, said reinforcing means including a generally planar member engaging said first mounting means and covering the point at which force is applied to said vehicle frame and further wherein a portion of said member is bent to increase the ability of said member to absorb forces applied to said vehicle frame and said member.

* * * * *